United States Patent

Yamakawa

[11] Patent Number: 6,088,167
[45] Date of Patent: Jul. 11, 2000

[54] OPTICAL SCANNING APPARATUS

[75] Inventor: Hiromitsu Yamakawa, Omiya, Japan

[73] Assignee: Fuji Photo Optical Co., Ltd., Saitama, Japan

[21] Appl. No.: 09/260,542

[22] Filed: Mar. 2, 1999

[30] Foreign Application Priority Data

Mar. 10, 1998 [JP] Japan ................... 10-076678

[51] Int. Cl.[7] .............. G02B 3/00; G02B 26/08
[52] U.S. Cl. ................ 359/662; 359/205; 359/206; 359/216
[58] Field of Search .................. 359/662, 205, 359/206, 207, 216, 218, 219

[56] References Cited

U.S. PATENT DOCUMENTS 5,438,450  8/1995  Saito ........................ 359/216

*Primary Examiner*—Georgia Epps
*Assistant Examiner*—Saeed Seyrafi
*Attorney, Agent, or Firm*—Ronald R. Snider; Snider & Associates

[57] ABSTRACT

In an optical scanning apparatus for causing a luminous flux from a rotary polygon mirror 4 to form an image on a surface to be scanned 6, a concave lens 5a functions not only as one constituent of an f θ lens with respect to the luminous flux scanned by the rotary polygon mirror 4 but also as a cylindrical lens for forming a linear image in the vicinity of a deflecting and reflecting surface of the rotary polygon mirror 4 with respect to a luminous flux from a laser light source 1. The luminous flux directed from the light source 1 to the rotary polygon mirror 4 is passed through the concave lens 5a such as to intersect the optical axis of the f θ lens.

3 Claims, 3 Drawing Sheets

OPTICAL SCANNING APPARATUS

RELATED APPLICATIONS

This application claims the priority of Japanese Patent Application No. 10-76678 filed on Mar. 10, 1998, which is incorporated herein by reference.

BACKGROUND OF THE INVENTION

1. Field of the Invention

The present invention relates to an optical scanning apparatus such as laser printer, laser plate-making machine, or the like which scans a light spot on a surface to be scanned.

2. Description of the Prior Art

Optical scanning apparatus such as laser printer, laser plate-making machine, and the like have conventionally been known, in which a light beam such as laser beam is scanned on a surface to be scanned made of a photosensitive material or the like so as to form an image on this surface. A light-scanning optical system employed in such an optical scanning apparatus comprises a light deflector such as rotary polygon mirror which reflects and deflects a light beam emitted from a light source such that the light beam is scanned on the surface to be scanned, and an imaging optical system for focusing the light beam onto the surface to be scanned.

In general, such an optical scanning apparatus is provided with an imaging optical system, comprising various kinds of lenses, disposed in front of or behind the light deflector, while an f θ lens is located in the last stage thereof.

When various kinds of lenses are thus interposed between the light source and the surface to be scanned, however, then the overall length of the optical path inevitably increases, thereby making it difficult for the apparatus to have a compact size.

Also, in such an imaging optical system, the heat from the light source and the rotation of the light deflector may generate turbulence in the air, thereby adversely affecting the optical scanning. Hence, there has been a demand for a technique which can suppress the influence of the air turbulence as much as possible even under such an environment.

Further, there has been a strong demand for a technique which reduces the number of components of optical members constituting the imaging optical system while favorably maintaining its imaging performances, thereby making the apparatus compact and cutting down its manufacturing cost.

In view of such circumstances, it is an object of the present invention to provide an optical scanning apparatus which can shorten the overall length of the optical path in the air between the light source and the surface to be scanned, thereby being able to make the apparatus compact and reduce its manufacturing cost while alleviating the adverse effects caused by the turbulence in the air.

In optical scanning apparatus, on the other hand, there has generally been known a configuration in which, in order to control the timing of optical scanning on the surface to be scanned, a luminous flux scanned outside the surface by the light deflector is received by a light-receiving sensor, and the timing of the optical scanning is controlled according to the resulting light-receiving timing.

Such a luminous flux for controlling the optical scanning timing has also been required to shorten the overall length of its optical path in the air so as to make the apparatus compact. Further, it is desirable to alleviate the adverse effects caused by the turbulence in the air due to the heat from the light source and the rotation of the light deflector with respect to such a luminous flux as well.

It is thus another object of the present invention to allow a luminous flux for controlling the timing of optical scanning in the optical scanning apparatus to have a shorter overall length of the optical path in the air, thereby making the apparatus compact and alleviating the adverse effects caused by the turbulence in the air on the luminous flux.

SUMMARY OF THE INVENTION

A first optical scanning apparatus in accordance with the present invention comprises a light source; a light deflector for deflecting and scanning a luminous flux from the light source; a first optical system, disposed between the light source and the light deflector, for converging the luminous flux in a direction orthogonal to a light-scanning direction of the light deflector and linearly focusing the luminous flux near a light-deflecting surface of the light deflector; and a second optical system for causing the linear luminous flux deflected by the light-deflecting surface to form a point-like image on a surface to be scanned; whereby a light spot formed as the point-like image on the surface to be scanned is scanned according to an operation of the light deflector;

wherein at least one lens constituting the second optical system transmits therethrough the luminous flux directed from the light source to the light deflector, such that the luminous flux intersects an optical axis of the second optical system within this lens.

Preferably, at least one lens constituting the second optical system has such a lens shape that the luminous flux directed from the light source to the light deflector is converged in a direction orthogonal to a plane of the optical scanning.

A second optical scanning apparatus in accordance with the present invention comprises a light source; a light deflector for deflecting and scanning a luminous flux from the light source; an imaging optical system for focusing thus deflected luminous flux onto a surface to be scanned; and a light-receiving sensor for receiving the deflected luminous flux in order to control a scanning timing of the luminous flux on the surface to be scanned; whereby a light spot converged on the surface to be scanned is scanned according to an operation of the light deflector;

wherein at least one lens constituting the imaging optical system transmits therethrough the luminous flux directed from the light deflector to the sensor, such that the luminous flux intersects an optical axis of the imaging optical system within this lens.

DESCRIPTION OF THE PREFERRED EMBODIMENTS

In the following, embodiments of the present invention will be explained with reference to the accompanying drawings.

Figure 1:
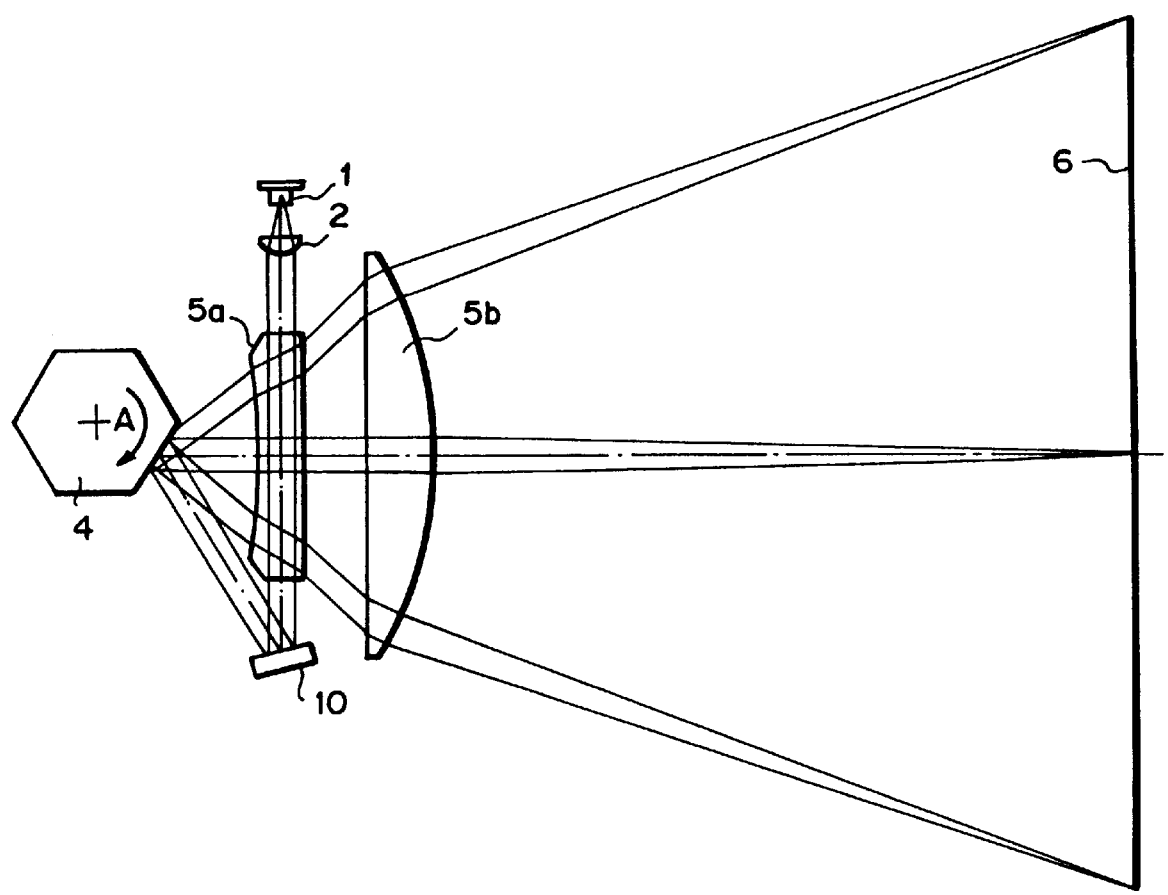
FIG. 1 is a schematic view showing an optical scanning apparatus in accordance with a first embodiment of the present invention.

FIG. 1 is a schematic view showing the configuration of the optical scanning apparatus in accordance with a first embodiment. As shown in FIG. 1, the optical scanning apparatus in accordance with this embodiment comprises a laser light source 1, a collimator lens 2 for converting a laser beam emitted from the laser light source 1 into a parallel luminous flux, a reflecting mirror 10 for bending the luminous flux from the collimator lens 2 into a predetermined direction, a rotary polygon mirror 4 for reflecting and deflecting the laser beam so as to scan a surface to be scanned 6, and a concave lens 5a and a convex lens 5b which constitute an f θ lens system for causing the laser beam reflected and deflected by the rotary polygon mirror 4 to form an image within the main scanning area on the surface to be scanned 6.

In such an optical system, there has generally been known a configuration in which, in order to eliminate the influence of surface tilting in each light-deflecting and reflecting surface of the rotary polygon mirror 4, a cylindrical lens or the like is used for causing the laser beam from the laser light source 1 to form a linear image in the vicinity of the light-deflecting and reflecting surface of the rotary polygon mirror 4. In this embodiment, the concave lens 5a is provided with the function of the above-mentioned cylindrical lens.

Namely, the concave lens 5a is configured such as to function not only as one constituent of the f θ lens with respect to the luminous flux scanned by the rotary polygon mirror 4 but also as a cylindrical lens for forming a linear image in the vicinity of the light-deflecting and reflecting surface of the rotary polygon mirror 4 with respect to the luminous flux from the laser light source 1.

Figure 2:
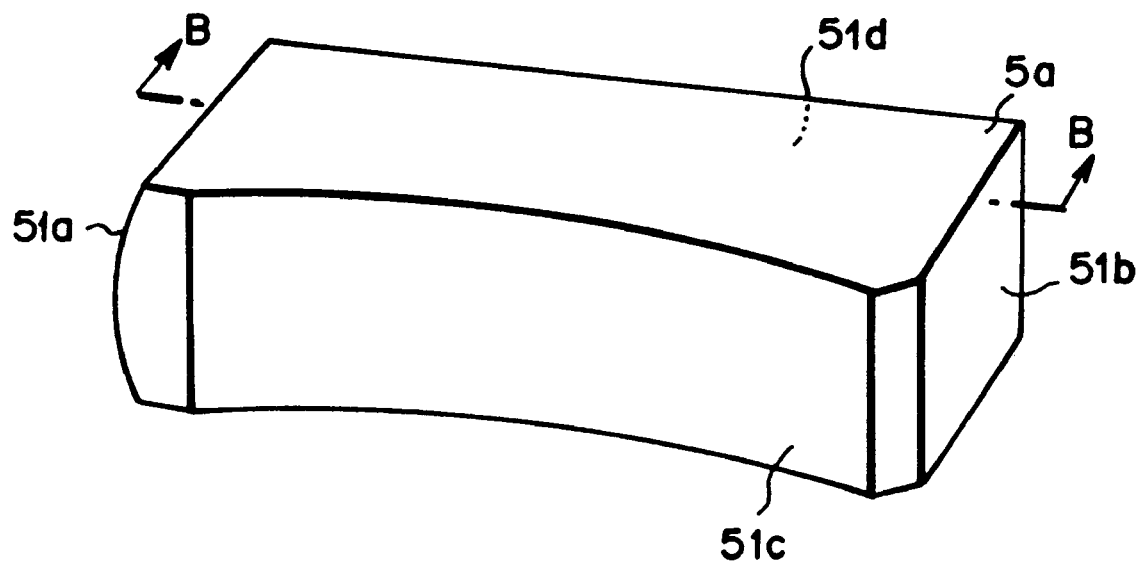
FIG. 2 is a perspective view showing the outer shape of a lens used in the apparatus shown in FIG. 1.
Figure 3:
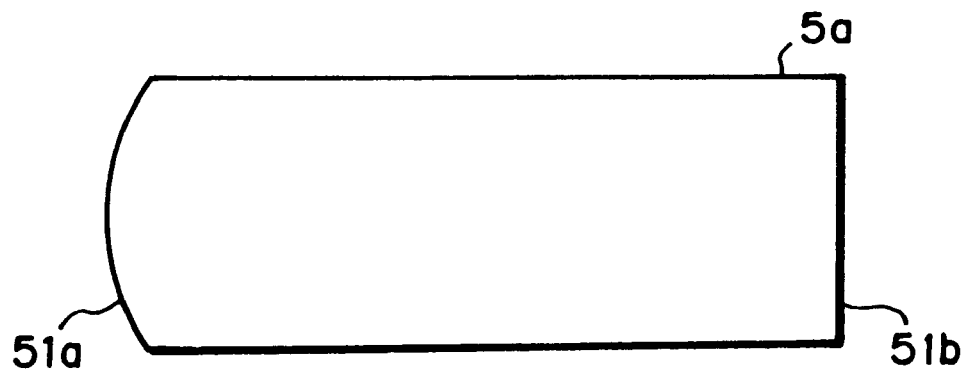
FIG. 3 is a sectional view of the lens shown in FIG. 2, taken along the line B—B.

FIG. 2 is a perspective view showing the outer shape of the concave lens 5a, whereas FIG. 3 is a sectional view taken along the B—B line of FIG. 2.

As shown in FIG. 2, the concave lens 5a constituting the f θ lens is made of a glass material and has a planoconcave lens form in a first direction with a smaller lens thickness and a cylindrical convex lens form in a second direction with a greater lens thickness. This cylindrical convex lens has a power only in a direction orthogonal to the main scanning direction on the surface to be scanned 6.

Namely, the laser beam emitted from the laser light source 1 and converted into the parallel light through the collimator lens 2 enters the concave lens 5a from a side face 51a thereof having a convex cylindrical form and exits from its opposite planar side face 51b so as to be converged in only one direction. Thus emitted light is reflected by the reflecting mirror 10, so as to form a linear image in the vicinity of the light-deflecting and reflecting surface of the rotary polygon mirror 4.

The laser beam that has formed the linear image is continuously deflected within a predetermined angular range in response to the rotation of the rotary polygon mirror 4 in the direction of arrow A, so as to enter a concave surface 51c of the concave lens 5a constituting the f θ lens system and exit from its planar surface 51d. Further, thus emitted beam enters the convex lens 5b from the surface thereof facing the concave lens 5a and exits therefrom via the surface thereof facing the surface to be scanned 6. Due to the function of these two lenses 5a, 5b as the f θ lens, the laser beam is scanned on the surface to be scanned 6 within a predetermined range.

Here, the convex lens 5b is a toric lens whose power varies between its main scanning cross section and sub-scanning cross section, and the f θ lens is conjugate between the light-deflecting and reflecting surface and the surface to be scanned 6 in the sub-scanning section, thereby constituting a system for correcting the surface tilting.

Thus, the laser beam from the laser light source 1 passes through the concave lens 5a twice before reaching the surface to be scanned 6, with the resulting two optical paths within the concave lens 5a being orthogonal to each other.

When the light-scanning optical system is configured such that a laser beam passes through one lens 5a twice with the resulting optical paths intersecting each other, then optical members can be arranged in a smaller space. Also, when it is configured such that the laser beam passes through the lens 5a from one side face to the other side face, then, according to the difference in refractive index between glass and air, the geometrical length of the optical path in the air can be made shorter than that in the configuration in which the laser beam is made to pass through the air.

Also, since the laser beam can pass through the glass member by a long distance, the adverse effects caused by the turbulence in the air due to the heat from the laser light source, rotation of the light deflector, or the like can be alleviated.

Though only one side face 51a is formed into a convex cylindrical surface in the above-mentioned embodiment, both of the side faces 51a, 51b may be made as convex cylindrical surfaces. Alternatively, one of the side faces 51a, 51b may be formed into a convex cylindrical surface having a greater curvature, whereas the other of the side faces 51a, 51b is formed into a concave cylindrical surface having a smaller curvature.

Figure 4:
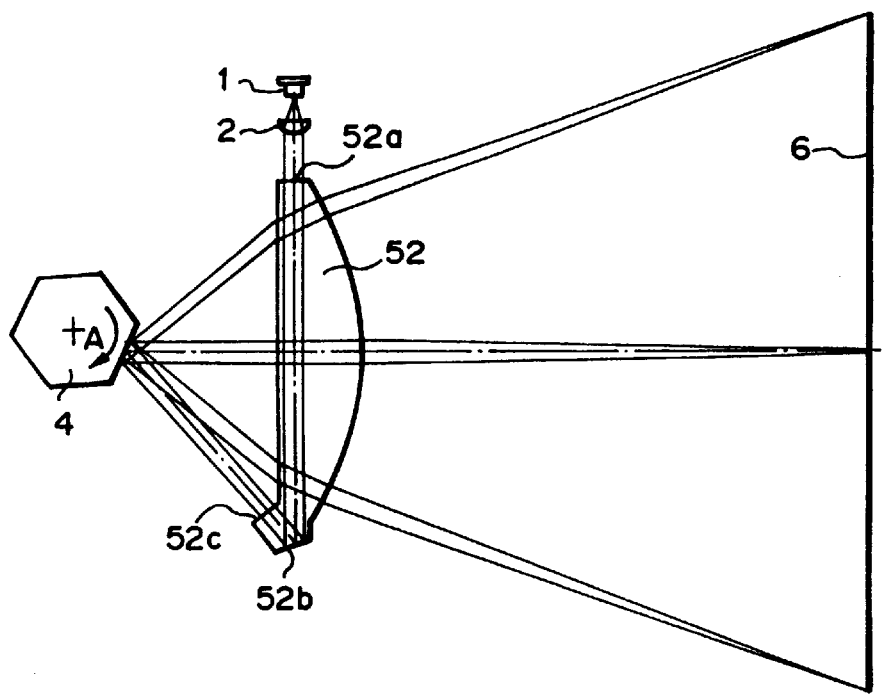
FIG. 4 is a schematic view showing an optical scanning apparatus in accordance with a second embodiment of the present invention.

FIG. 4 is a schematic view showing an optical scanning apparatus in accordance with a second embodiment of the present invention.

In this optical scanning apparatus, an f θ lens is constituted by one convex lens 52 made of a plastic material. One side face 55a of the convex lens 52 is a convex cylindrical surface, whereas a side face 55b opposite to the former side face 55a is a planar mirror surface. Further, a light exit surface 55c from which a laser beam entering the convex lens 52 via the side face 55a exits after being reflected by the side face 55b is made flat. The above-mentioned one side face 55a has a power only in a direction orthogonal to the main scanning direction on the surface to be scanned 6.

The laser beam emitted from a laser light source 1 and then converted into parallel light by a collimator lens 2 is turned into light which converges in only one direction at the side face 55a having a convex cylindrical surface. Then, as with the first embodiment, the light forms a linear image in the vicinity of a light-deflecting and reflecting surface of a rotary polygon mirror 4.

Here, within the convex lens 52, the laser beam directed from the laser light source 1 to the rotary polygon mirror 4 and the laser beam directed from the rotary polygon mirror 4 to the surface to be scanned 6 are orthogonal to each other.

The optical scanning apparatus in accordance with this embodiment can also attain effects similar to those in the optical reflecting apparatus in accordance with the first embodiment.

Figure 5:
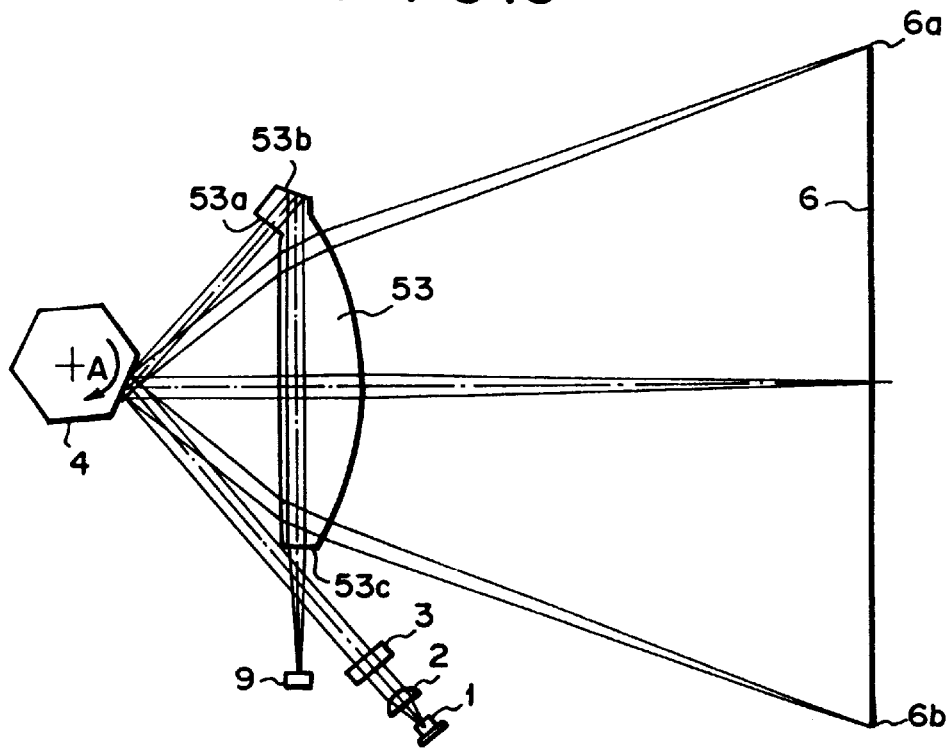
FIG. 5 is a schematic view showing an optical scanning apparatus in accordance with a third embodiment of the present invention.

FIG. 5 is a view showing the optical scanning apparatus in accordance with a third embodiment of the present invention.

In this optical scanning apparatus, a laser beam emitted from a laser light source 1 and then converted into parallel light by a collimator lens 2 is caused by a cylindrical lens 3 to form a linear image in the vicinity of a light-deflecting and reflecting surface of a rotary polygon mirror 4. By using a convex lens 53, made of a plastic material, functioning as an f θ lens, the surface to be scanned 6 is optically scanned from one end position 6a to the other end position 6b along with the rotation of the rotary polygon mirror 4 in the direction of arrow A.

Here, the convex lens 53 is a lens whose power varies between its main scanning cross section and sub-scanning cross section, and the f θ lens is conjugate between the light-deflecting and reflecting surface and the surface to be scanned 6 in the sub-scanning section, thereby constituting a system for correcting the surface tilting. Its main scanning cross-sectional form is represented by a high-order function (noncircular form), thereby functioning as the f θ lens by a single lens.

The cylindrical lens 3 has a power only in a direction orthogonal to the main scanning direction on the surface to be scanned 6. Further, in the optical scanning apparatus, a laser beam scanned outside the end position 6a of the surface to be scanned 6 is made incident on a light entrance surface 53a formed at a side corner position of the convex lens 53 and then is regularly reflected by a side face 53b formed as a planar mirror surface, so as to pass through the convex lens 53 while intersecting the main optical axis (the optical axis in the direction functioning as the f θ lens) of the convex lens 53. Then, the laser beam is outputted from the side face 53c, so as to be made incident on a laser light-receiving sensor 9.

As a consequence, the optical scanning timing on the surface to be scanned 6 can be detected in response to the timing at which the laser beam is received by the light-receiving sensor 9, and the optical scanning can be controlled according to thus detected optical scanning timing in the optical scanning apparatus in accordance with this embodiment.

The side face 53c of the convex lens 53 is made as a convex cylindrical surface, with its axial direction being orthogonal to the axial direction of the cylindrical surface of the cylindrical lens 3. While the cylindrical lens 3 has a power only in a direction orthogonal to the light-scanning direction (main scanning direction) on the surface to be scanned 6, the side face 53c is formed into a toric surface which has a power not only in the direction orthogonal to the main scanning direction but also within a plane including the main scanning direction, whereby the linear image formed on the light-deflecting and reflecting surface of the rotary polygon mirror 4 is formed as a point image on the light-receiving sensor 9.

In thus configured optical scanning apparatus in accordance with this embodiment, as a laser beam for detecting the optical scanning timing is passed through the convex lens 53 from one side face 53b to the other side face 53c, the geometrical length of the optical path in the air can be shortened in response to the difference in refractive index between the glass and the air, whereby the adverse effects caused by the turbulence in the air due to the heat from the laser light source 1, rotation of the light deflector, or the like can be alleviated.

Of course, instead of forming a mirror surface at one side face 53b of the convex lens 53 as in the above-mentioned embodiment, a reflecting mirror can be disposed outside the convex lens 53. Also, though a toric surface is formed at the side face 53c acting as the light exit surface in this embodiment, it can be made as a cylindrical surface or spherical surface. Further, in place thereof or together therewith, the light entrance surface 53a can be formed into a cylindrical surface, toric surface, or spherical surface.

In each of the above-mentioned embodiments, the surface to be scanned 6 and the light spot formed on the surface to be scanned 6 are relatively moved with respect to each other in a direction orthogonal to the above-mentioned main scanning direction so as to effect sub-scanning.

Without being restricted to the above-mentioned embodiments, the optical scanning apparatus in accordance with the present invention can be modified in various manners. For example, the lens 5a having different lens functions in two respective directions can be made of a plastic material, while the lenses 52, 53 can be made of a glass material.

Also, in place of the laser light source, a light source emitting light other than the laser light can be employed. Further, the light deflector is not limited to a rotary polygon mirror. Other light deflectors can be used as long as they are configured such that a linear image is once formed on a light-deflecting surface.

It is not always necessary for the lens optical axis in the direction functioning as the second optical system or imaging optical system in the apparatus of the present invention and the luminous flux traveling between both end faces of the lens to intersect each other so as to be orthogonal to each other. They can intersect each other at other angles as well.

At least one lens constituting the second optical system of the optical scanning apparatus in accordance with the present invention may constitute not only an f θ lens system but also any other imaging lens system.

As explained in the foregoing, in the optical scanning apparatus in accordance with the present invention, a luminous flux directed from a light source to a light deflector or a luminous flux directed from the light deflector to a light-receiving sensor for determining the scanning timing is passed through at least one lens of an optical system for focusing a luminous flux from the light deflector onto a surface to be scanned such as to intersect the optical axis of the imaging optical system.

As a consequence, the geometrical distance in the air for the luminous flux from the light source to the surface to be scanned or the luminous flux from the light source to the light-receiving sensor can be made shorter than that in a configuration in which such a luminous flux does not pass through the imaging optical system. Also, as the imaging optical system is provided with a predetermined lens function, the number of lenses can be reduced, whereby the space and cost can saved.

Further, since the optical path in the air can be shortened, the adverse effects caused by the turbulence in the air due to the heat from the light source, rotation of the light deflector, or the like can be alleviated.

What is claimed is:

1. An optical scanning apparatus comprising a light source; a light deflector for deflecting and scanning a luminous flux from said light source; a first optical system, disposed between said light source and said light deflector, for converging said luminous flux in a direction orthogonal to a light-scanning direction of said light deflector and linearly focusing said luminous flux near a light-deflecting surface of said light deflector; and a second optical system for causing said linear luminous flux deflected by said light-deflecting surface to form a point-like image on a surface to be scanned; whereby a light spot formed as the point-like image on said surface to be scanned is scanned according to an operation of said light deflector;

wherein at least one lens within said second optical system transmits therethrough the luminous flux directed from said light source to said light deflector, such that said luminous flux intersects an optical axis of said second optical system within said lens.

2. An optical scanning apparatus according to claim 1, wherein at least one lens within said second optical system has such a lens shape that said luminous flux directed from said light source to said light deflector is converged in a direction orthogonal to a plane of said optical scanning.

3. An optical scanning apparatus comprising a light source; a light deflector for deflecting and scanning a luminous flux from said light source; an imaging optical system for focusing thus deflected luminous flux onto a surface to be scanned; and a light-receiving sensor for receiving said deflected luminous flux in order to control a scanning timing of the luminous flux on said surface to be scanned; whereby a light spot converged on said surface to be scanned is scanned according to an operation of said light deflector;

wherein at least one lens within said imaging optical system transmits therethrough the luminous flux directed from said light deflector to said sensor, such that said luminous flux intersects an optical axis of said imaging optical system within said lens.

* * * * *